United States Patent
Lee et al.

(10) Patent No.: US 9,448,844 B2
(45) Date of Patent: Sep. 20, 2016

(54) COMPUTING SYSTEM AND METHOD CONTROLLING MEMORY OF COMPUTING SYSTEM

(75) Inventors: Jae Don Lee, Paju-si (KR); Shi Hwa Lee, Seoul (KR); Seung Won Lee, Hwaseong-si (KR); Chae Seok Lim, Suwon-si (KR); Min Kyu Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 12/881,752

(22) Filed: Sep. 14, 2010

(65) Prior Publication Data

US 2011/0119463 A1 May 19, 2011

(30) Foreign Application Priority Data

Nov. 13, 2009 (KR) .................. 10-2009-0109634

(51) Int. Cl.
*G06F 12/00* (2006.01)
*G06F 13/00* (2006.01)
*G06F 13/28* (2006.01)
*G06F 9/50* (2006.01)

(52) U.S. Cl.
CPC .................................. *G06F 9/5016* (2013.01)

(58) Field of Classification Search
CPC .................................................... G06F 9/5016
USPC .................................................. 711/170, 171
See application file for complete search history.

(56) References Cited

U.S. PATENT DOCUMENTS

| | | | | |
|---|---|---|---|---|
| 4,951,194 A | * | 8/1990 | Bradley et al. | 711/132 |
| 5,539,893 A | * | 7/1996 | Thompson et al. | 711/122 |
| 5,784,699 A | * | 7/1998 | McMahon et al. | 711/171 |
| 5,953,741 A | * | 9/1999 | Evoy et al. | 711/132 |
| 6,081,895 A | * | 6/2000 | Harrison et al. | 713/189 |
| 6,131,144 A | * | 10/2000 | Koppala | 711/132 |
| 6,662,288 B1 | * | 12/2003 | Hamada et al. | 711/201 |
| 7,533,236 B1 | * | 5/2009 | Nordquist | 711/170 |
| 8,578,347 B1 | * | 11/2013 | Carrick et al. | 717/133 |
| 2003/0105927 A1 | * | 6/2003 | Aoki | 711/132 |
| 2003/0217246 A1 | * | 11/2003 | Kubota et al. | 711/170 |
| 2004/0019744 A1 | * | 1/2004 | Boucher | 711/132 |
| 2004/0148495 A1 | * | 7/2004 | Elbe et al. | 712/220 |
| 2004/0207630 A1 | * | 10/2004 | Moreton et al. | 345/543 |
| 2005/0005018 A1 | * | 1/2005 | Datta | 709/229 |

(Continued)

FOREIGN PATENT DOCUMENTS

| | | |
|---|---|---|
| JP | 6-51980 | 2/1994 |
| JP | 7-78092 | 3/1995 |

(Continued)

OTHER PUBLICATIONS

Korean Office Action issued on Jun. 4, 2015 in counterpart Korean Application No. 10-2009-0109634 (5 pages in English, 6 pages in Korean).

*Primary Examiner* — Sheng-Jen Tsai
(74) *Attorney, Agent, or Firm* — NSIP Law (57) ABSTRACT

Provided is a computing system having a hierarchical memory structure. When a data structure is allocated with respect to a task processed in the computing system, the data structure is divided and a portion of the data structure is allocated to a high speed memory of the hierarchical memory structure and a remaining data structure is allocated to a low speed memory of the hierarchical memory.

16 Claims, 10 Drawing Sheets

(56) References Cited

U.S. PATENT DOCUMENTS

| | | | |
|---|---|---|---|
| 2005/0028159 A1* | 2/2005 | Kodama et al. | 718/100 |
| 2005/0235127 A1* | 10/2005 | Muthiah et al. | 711/170 |
| 2006/0026394 A1* | 2/2006 | Chauvel | G06F 9/30174 |
| | | | 712/221 |
| 2006/0230409 A1* | 10/2006 | Frigo et al. | 718/108 |
| 2007/0169125 A1* | 7/2007 | Qin | 718/102 |
| 2007/0294206 A1* | 12/2007 | Korman et al. | 707/1 |
| 2008/0127201 A1* | 5/2008 | Mori et al. | 718/108 |
| 2008/0140979 A1* | 6/2008 | Kim et al. | 711/170 |
| 2008/0189488 A1* | 8/2008 | DeWitt et al. | 711/132 |
| 2008/0276063 A1* | 11/2008 | Kim et al. | 711/171 |
| 2009/0144756 A1* | 6/2009 | Inami | 719/318 |
| 2009/0210527 A1* | 8/2009 | Kawato | G06F 9/45558 |
| | | | 709/224 |
| 2010/0070974 A1* | 3/2010 | Inoue | 718/101 |
| 2010/0174762 A1* | 7/2010 | Bryan et al. | 707/814 |
| 2010/0191929 A1* | 7/2010 | Rawson, III | 711/170 |
| 2010/0192156 A1* | 7/2010 | Hollingsworth | G06F 9/5011 |
| | | | 718/104 |
| 2010/0325381 A1* | 12/2010 | Heim | 711/170 |
| 2011/0167242 A1* | 7/2011 | de Jong et al. | 712/205 |
| 2013/0055282 A1* | 2/2013 | Yi | 718/104 |

FOREIGN PATENT DOCUMENTS

| | | |
|---|---|---|
| JP | 2001-43093 | 2/2001 |
| JP | 3212656 | 7/2001 |
| JP | 2004-21610 | 1/2004 |
| JP | 2005-71141 | 3/2005 |
| JP | 2008-102847 | 5/2008 |

* cited by examiner

```
POP Rd :
     Rd = memory[SP] ;
     SP = SP - 1 ;
     If (SP == BRws ) SP = LRns ;
```

```
PUSH Rs :
    SP = SP + 1 ;
    If (SP == LRns) SP = BRws ;          710
    memory [SP] = RS ;
```

COMPUTING SYSTEM AND METHOD CONTROLLING MEMORY OF COMPUTING SYSTEM

CROSS-REFERENCE TO RELATED APPLICATIONS

This application claims the benefit of Korean Patent Application No. 10-2009-0109634, filed on Nov. 13, 2009, in the Korean Intellectual Property Office, the disclosure of which is incorporated herein by reference.

BACKGROUND

1. Field

Example embodiments relate to a memory management method that is related to a computing system having a hierarchical memory structure, and more particularly to a memory management method that improves use of a memory space when a call stack is allocated to an internal memory having a high data access speed in the hierarchical memory structure.

2. Description of the Related Art

A call stack may be a dynamic data structure storing information associated with a subroutine activated in a computer program. The call stack may be called as an execution stack, a control stack, a function stack, or a run-time stack, or may be just called as a stack.

The call stack may be used to store a return address, to perform a parameter passing, and to store local data.

A caller may push the return address onto the stack, and may pop the return address from the stack when the called subroutine completes a task. When the called subroutine calls another subroutine, the caller may push the return address of the caller onto the stack.

Generally, when a call stack for tasks is allocated in an internal memory having a high data access speed in a computing system including a hierarchical memory arrangement structure, it is preferable to increase use of a memory.

SUMMARY

Example embodiments provide a memory management method and a computing system having a hierarchical memory structure that may improve use of space of an internal memory having a high data access speed.

Additionally, example embodiments provide a memory management method having an improved calculation speed of a computing system, when a plurality of tasks is processed.

The foregoing and/or other aspects are achieved by providing a computing system, the computer system including a first memory to allocate an area storing a first data structure corresponding to a first task processed in a processor, a second memory to allocate an area storing a second data structure corresponding to the first task, and a memory controller to analyze an amount of a memory consumed processing the first task in the processor and to determine, based on the analyzed amount of the memory consumption, a size of the area storing the first data structure and a size of the area storing the second data structure.

The first memory may be an internal memory of the processor and the second memory is an external memory of the processor. The first memory may be a scratch pad memory.

The first data structure and the second data structure may be stacks.

The memory controller may analyze a temporal distribution of an amount of a memory consumed processing the first task in the processor, and may determine, as a size of the first data structure, a first threshold that is equal to or greater than an amount of a memory consumption that is greater than or equal to a first ratio.

The memory controller may determine, as a size of the second data structure, a difference between a maximum value in the analyzed temporal distribution of the amount of the memory consumption and the first threshold.

When a compiler of the computing system compiles a function, the computing system may generate machine code to adjust a stack pointer as a first address of the second data structure when the stack pointer is beyond an address of the first data structure while performing a stack PUSH command, and machine code to adjust the stack pointer as a last address of the first data structure when the stack pointer is beyond an address of the second data structure while performing a stack PUSH command.

The computing system may further include a first register to store the last address of the first data structure, and a second register to store a first address of the second data structure.

A code line may be added to macro code of a stack POP command when the stack pointer is the first address of the second data structure, and the code line may adjust the stack pointer as the last address of the first data structure.

A code line may be added to macro code of a stack POP command when the stack pointer is the last address of the first data structure, and the code line may adjust the stack pointer as the first address of the second data structure.

The first memory may further allocate a shared data structure area with respect to a plurality of tasks.

The foregoing and/or other aspects are achieved by providing a memory management method in a computing system, the method including analyzing an amount of a memory consumed processing a first task in a processor, allocating, to a first memory, a first data structure corresponding to the first task, the first data structure determined based on the analyzed amount of the memory consumption and a size of the first data structure a first threshold, and allocating, to a second memory, a second data structure corresponding to the first task, a size of the second data structure a difference between a maximum value in the analyzed amount of the memory consumption and the first threshold.

The first data structure and the second data structure may be stacks.

When a stack POP command is received, the method may further include determining whether a stack pointer is a first address of the second data structure, and adjusting the stack pointer as a last address of the first data structure when the stack pointer is the first address of the second data structure.

When a stack PUSH command is received, the method may further include determining whether a stack pointer is a last address of the first data structure, and adjusting the stack pointer as the first address of the second data structure when the stack pointer is the last address of the first data structure.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
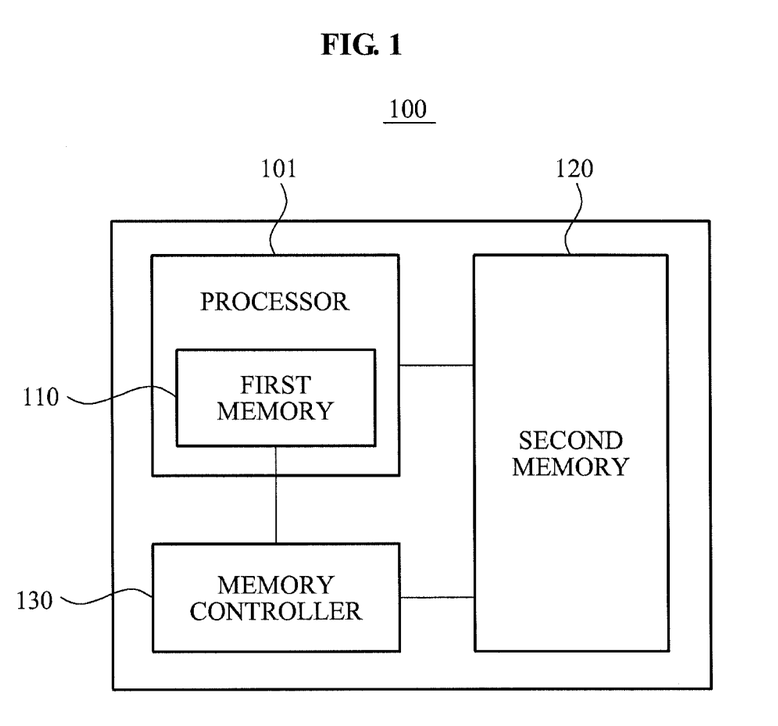
FIG. 1 is a diagram illustrating a computing system according to example embodiments.

FIG. 1 illustrates a computing system 100 according to example embodiments.

The computer system 100 may have a hierarchical memory arrangement structure.

In the hierarchical memory arrangement structure, a memory having a high data access speed may be selected as a first memory 110 that is located physically close to the processor 101.

For example, the first memory may be a high speed memory, such as a register, a cache, and the like.

Recently, an embedded system includes a scratch pad memory inside a processor to process data, and the scratch pad memory may have a high operational speed. In the example embodiments, the computing system 100 may be an embedded system, and the first memory 110 may be a scratch pad memory.

The first memory 110 may be relatively expensive, and thus, a small capacity memory may only be selected as the first memory 110. The memory may be arranged inside the processor, and may be referred to as an internal memory.

The processor may have, as a second memory 120, a memory that is relatively inexpensive but having a low data access speed. For example, the second memory 120 may be a main memory of the computing system, such as a Dynamic Random Access Memory (DRAM).

The second memory 120 may be relatively inexpensive, and thus, a relatively large capacity memory may be selected as the second memory 120. The second memory 120 may be arranged physically outside the processor and may be referred to as an external memory.

Therefore, when data used for performing a task is stored in the first memory 110 in the computing system 100 having a hierarchical memory arrangement structure, a speed of a calculation may increase, however, a cost of a system may also increase.

Accordingly, a relatively small storage space of the first memory 110 may be effectively used according to example embodiments.

When data associated with a task processed in the processor 101 is allocated as a stack to the first memory 110, a stack space usage may vary over time. Mostly, the stack space usage may be maintained to be less than or equal to a threshold value, and, in a predetermined time section, a worst case where the stack space usage significantly exceeds an average stack space usage may occur in a specific time period.

When a space is allocated to the first memory based on a maximum stack space usage, for data associated with the task processed in the processor 101, a usage rate of the first memory 110 may decrease.

Therefore, according to example embodiments, a memory controller 130 may analyze, in advance, a stack space usage to be used for each task to be performed in the processor 101.

The memory controller 130 may determine, as an amount of stack to be allocated to the first memory 110, a first threshold value that is equal to or greater than a first ratio.

For the worst case, the memory controller 130 may determine, as an amount of stack to be allocated to the second memory 120, a difference between a maximum value of the stack space usage and the first threshold value.

Figure 2:
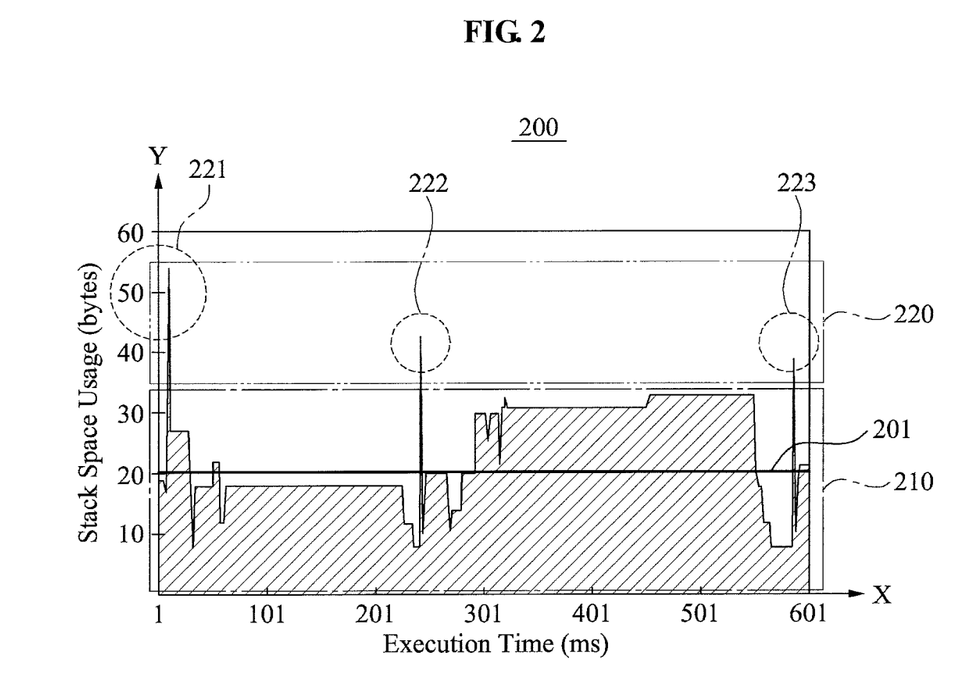
FIG. 2 is a graph illustrating a stack space usage of a first task over time, the graph describing an operation of a computing system.

FIG. 2 is a graph 200 illustrating a stack space usage of a first task over time, the graph 200 describing an operation of a computing system.

In the graph 200, an X-axis corresponds to a first task-processing time, and units are in milliseconds.

A Y-axis is a size of data to be stored in a stack structure to process the first task. The size of the data may be a stack space usage, and units may be in bytes.

Referring to the graph 200, a stack space usage may not usually exceed a threshold value. The threshold value may be higher than an average line 201.

According to example embodiments, a first threshold value, about 35 bytes, which may be equal to or greater than a stack space usage of an area 210 may be allocated to the first memory 110 as a normal stack for the first task.

A value, about 20 bytes, may be allocated to the second memory 120 as a worst case stack for the first stack, and the 20 bytes may be equal to or greater than an area 220 corresponding to a stack space usage of a worst case and may be a difference between the first threshold value and a maximum stack space usage.

Accordingly, the same stack for the first task may be dually allocated to both the first memory 110 having a relatively high speed and the second memory 120 having a relatively low speed.

Referring to the graph 200, areas 221, 222, and 223 indicating the stack space usage of the worst case may occupy a small portion among an entire task processing time.

For example, a time for pushing data onto the worst case stack allocated to the second memory 120 may be set to be less than two percent of the entire task processing time, when the data is pushed in the worst case. In this case, the first threshold value that may be equal to or greater than the stack space usage in the area 210 may be set to be about 35 bytes that may be equal to or greater than a distribution of stack space usage, and the distribution may be 98 percent of the entire task processing time.

A setting to determine the first threshold value may be changed, and may not be limited by example embodiments.

The normal stack may be allocated to the first memory 110 and the worst case stack may be allocated to the second memory 120 according to the determination.

Figure 3:
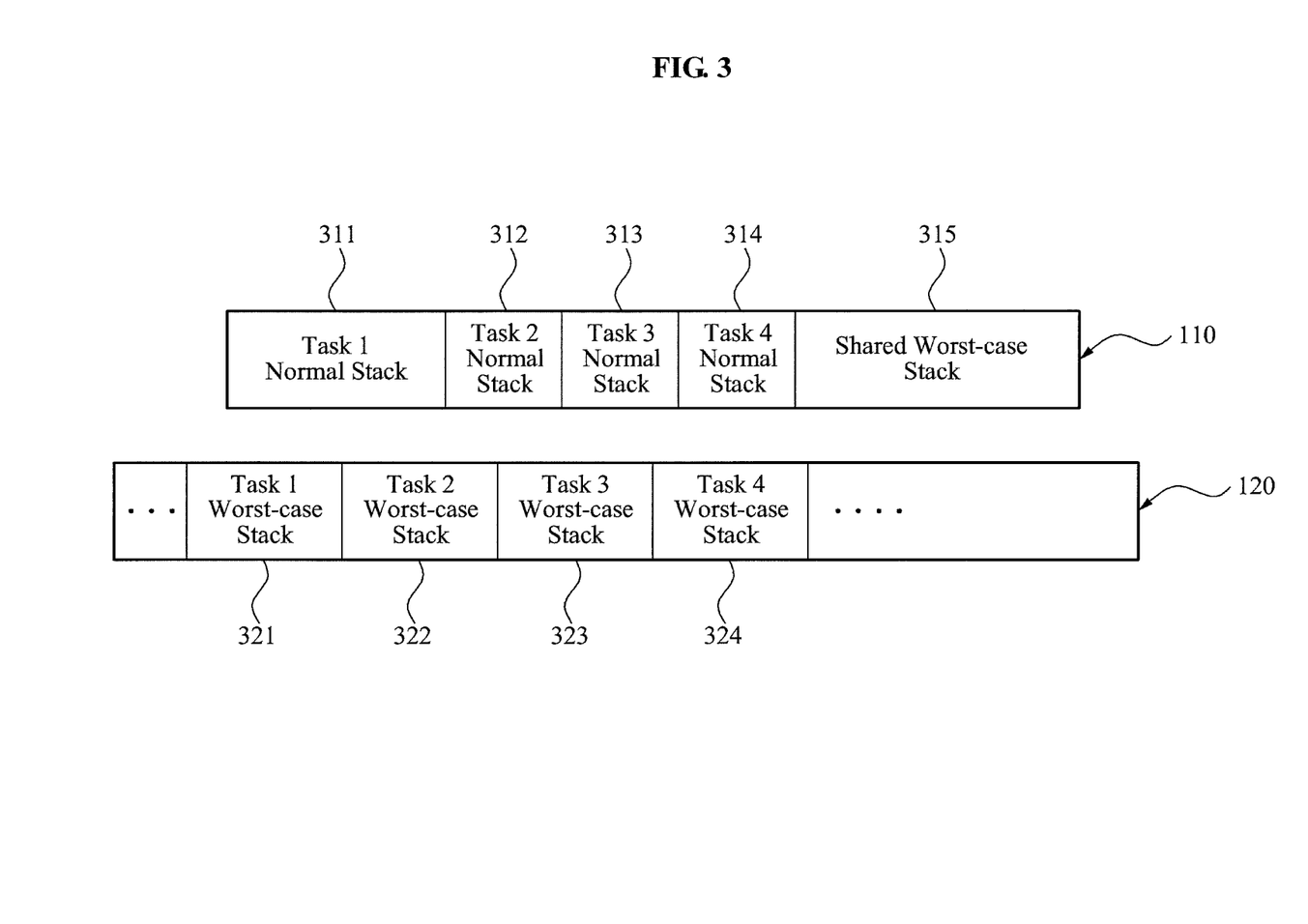
FIG. 3 is a diagram illustrating a process of allocating a normal stack and a worst case stack of tasks to a first memory and a second memory of FIG. 1, according to example embodiments.

FIG. 3 illustrates a process of allocating a normal stack and a worst case stack of tasks to the first memory 110 and the second memory of FIG. 1 according to example embodiments.

According to example embodiments, a stack is allocated to process four tasks including task 1 through task 4 in the processor 101.

The memory controller 130 may analyze a stack space usage used over time for each task, and the memory controller 130 may allocate normal stacks 311 through 314 and worst case stacks 321 through 324 based on respective analysis with respect to the stack.

In a case where a task 1 is processed in the processor 101, when a PUSH stack command is no longer performed since the stack is filled with the normal stack 311, namely, when the worst case is generated, data may be pushed onto the worst case stack 321.

In this case, the memory controller 130 may manage a stack pointer (SP) indicating an address of data that is most recently pushed onto a stack.

According to example embodiments, in a case where the stack PUSH command is performed while the task 1 is processed, when the SP is determined as a last address of the normal stack 311, the SP may be adjusted to be a first address of the worst case stack 321 as opposed to being a first address of the normal stack 312 which is an immediately subsequent address.

In a case where a stack POP command is performed while the task 1 is processed, when the SP is determined as a first address of the worst case stack 321, the SP may be adjusted to be a last address of the normal stack 311 as opposed to being an address immediately preceding the SP.

The above-described process will be described with reference to FIGS. 4 through 7.

According to example embodiments, a shared worst case stack 315 that may be shared by all tasks may be allocated to the first memory 110.

In this case, the shared worst case stack 315 may be used as a primary worst case stack with respect to a first task that is currently processed in the processor 101. When data may no longer be pushed onto the shared worst case stack 15, a dedicated worst case stack 321 corresponding to the first task may be used as a secondary worst case stack.

When a task to be processed in the processor 101 is changed by a context change from the first task into a second task, the data stored in the shared worst case stack 315 may be moved to the dedicated worst case stack 321. The shared worst case stack 315 may be used as a primary worst case stack of the second task.

Figure 4:
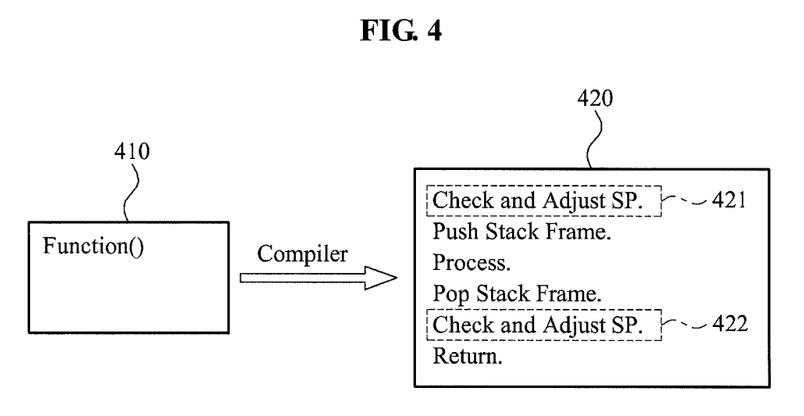
FIG. 4 is a diagram illustrating an operation of a compiler in a computing system according to example embodiments.

FIG. 4 illustrates an operation of a compiler in the computing system 100 according to example embodiments.

When a function 410 written in a high-level language is compiled in the computing system 100, machine code 420 may be generated.

When a function is compiled in a conventional computing system, a stack frame may be pushed onto a stack and the stack frame may be popped from the stack after the function performs a calculation, and thus, machine code that returns to a previous function may be generated.

In a case where the function 410 is compiled in the computing system 100 according to example embodiments, when the stack frame is pushed onto the stack and a SP is a last address of a normal stack, a code line 421 may be added, the code line 421 adjusting the SP as a first address of a worst case stack as opposed to an immediately subsequent address of the SP.

In a case where the stack frame is popped from the stack, when the SP is the first address of the worst case stack, a code line 422 may be added, the code line 422 adjusting the SP as the last address of the normal stack as opposed to an address immediately preceding the SP.

In this case, compared with the conventional computing system, the normal stack and the worst case stack may be managed, without a change, by slightly adjusting the complier.

Figure 5:
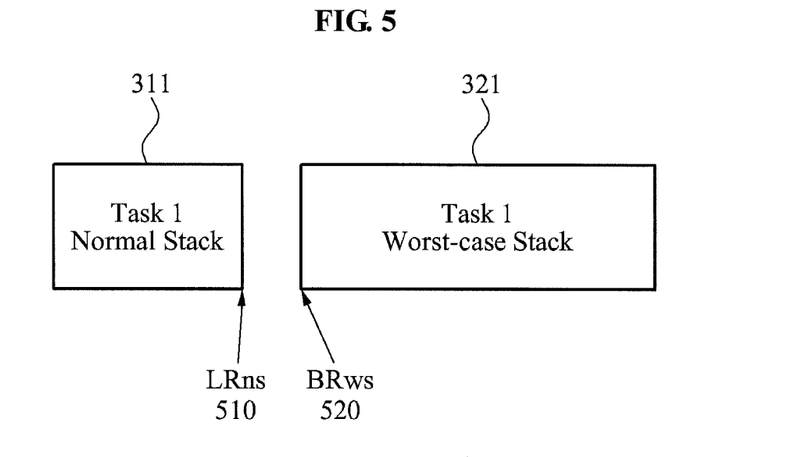
FIG. 5 is a diagram illustrating a pointer indicating a normal stack allocation area and a pointer indicating a worst case stack allocation area in a computing system according to example embodiments.

FIG. 5 illustrates a pointer indicating a normal stack allocation area and a pointer indicating a worst case stack allocation area in a computing system 100 according to example embodiments.

A first pointer indicating a last address of a normal stack of a first task may be stored in a limit register of normal stack (LRns) 510. A second pointer indicating a first address of a worst case stack of the first task may be stored in a Base Register of worst case stack (BRws) 520.

In this case, micro code that performs a stack POP command and a stack PUSH command may be changed, which will be described with reference to FIGS. 6 and 7.

Figure 6:
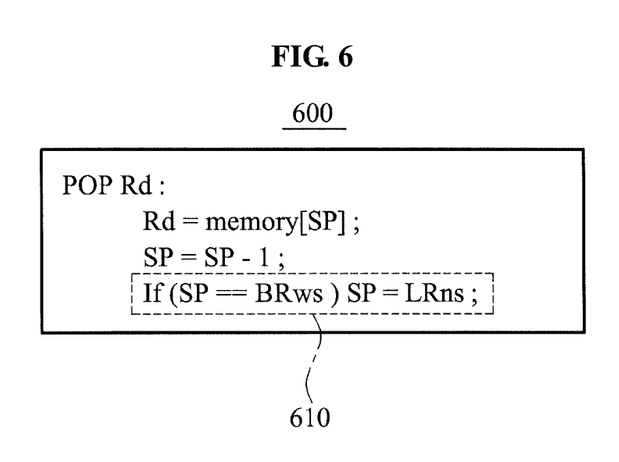
FIG. 6 is a diagram illustrating code of a stack POP command code in a computing system according to example embodiments.

FIG. 6 illustrates pseudo code 600 of a stack POP command in the computing system 100 according to example embodiments.

The pseudo code 600 for the stack POP command may be corrected from general micro code. In this case, whenever the stack POP command is performed, it may be determined whether a current SP and BRws of FIG. 5 are the same, and a code line 610 may be added when the current SP and the BRws are the same, the code line 610 adjusting the SP to be the same as the LRns.

According to example embodiments, a compiler of the computing system 100 may not require correction.

Figure 7:
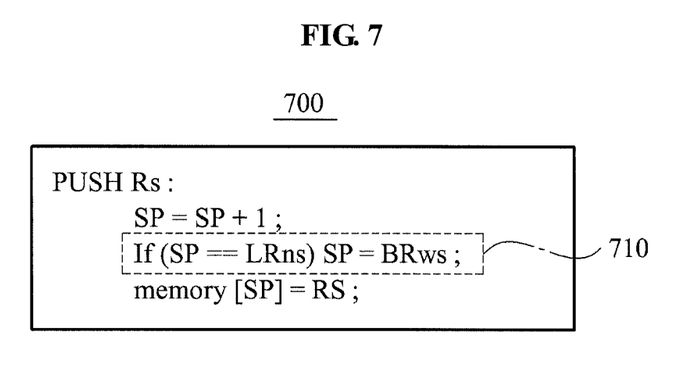
FIG. 7 is a diagram illustrating code of a stack PUSH command in a computing system according to example embodiments.

FIG. 7 illustrates pseudo code 700 of a stack PUSH command in the computing system 100 according to example embodiments.

Whenever a stack PUSH command is performed, it may be determined whether a current SP and the LRns of FIG. 5 are the same, and a code line 710 may be added to the micro code 700 for the stack PUSH command when the SP and the LRns are the same, the code line 710 adjusting the SP as the BRws.

According to the example embodiments, the compiler of the computing system 100 may not require correction.

Figure 8:
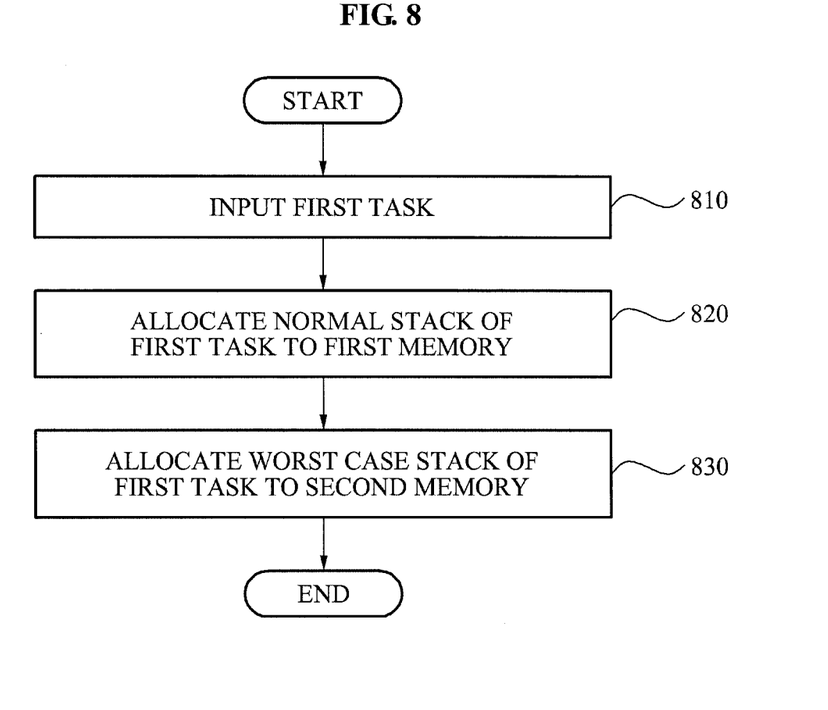
FIG. 8 is a flowchart illustrating a memory management method according to example embodiments.

FIG. 8 is a flowchart illustrating a memory management method according to example embodiments.

In operation 810, a first task to be processed in the processor 101 is input.

In operation 820, the memory controller 130 analyzes a stack space usage of the first task over time. A size of a normal stack and a size of a worst case stack for the first task may be determined.

A process of determining the size of the normal stack and the size of the worst case stack has been described with reference to FIG. 2 and thus, redundant descriptions will be omitted herein.

The memory controller 130 may allocate the normal stack of the first task to the first memory 110.

In operation 830, the memory controller 130 may allocate the worst case stack of the first task to the second memory 120.

With respect to four tasks including the first task, the normal stack is allocated to the first 110 and the worst case stack is allocated to the second memory 120 based on the described process. The allocation has been described with reference to FIG. 3 and thus, redundant descriptions will be omitted herein.

Figure 9:
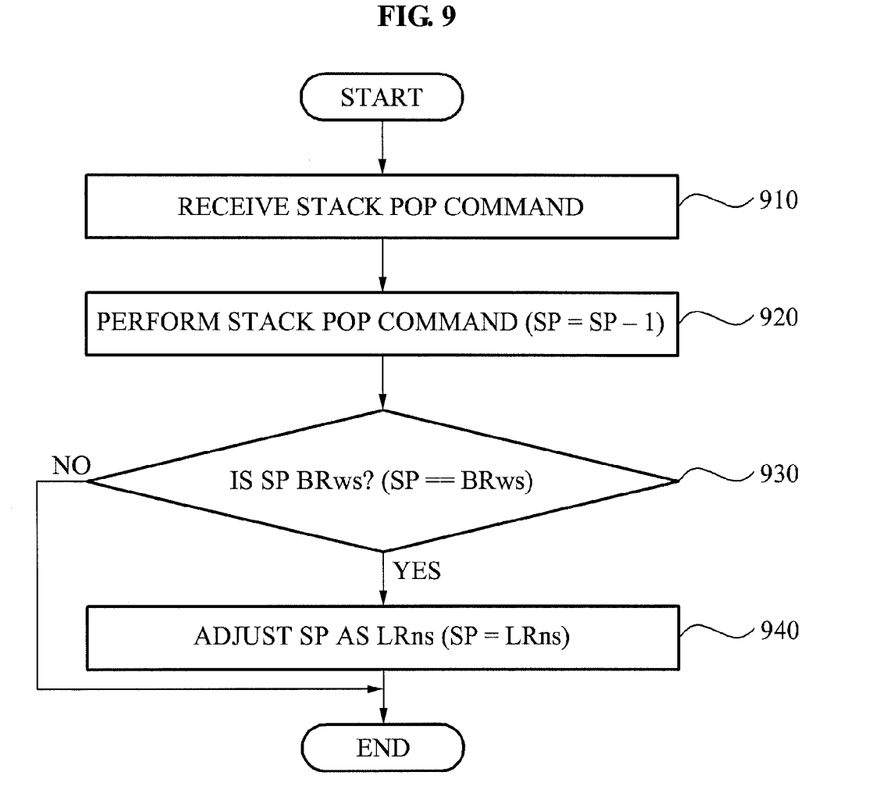
FIG. 9 is a flowchart illustrating a process of performing a stack POP command according to a memory management method according to example embodiments.

FIG. 9 illustrates a process of performing a stack POP command according to a memory management method according to example embodiments.

In operation 910, a stack POP command is received. In operation 920, the stack POP command is performed and an SP may be decremented by "1".

In operation 930, it may be determined whether the SP is the same as the BRws of FIG. 5.

When the SP is the same as the BRws, the SP may be adjusted to be the same as the LRns of FIG. 5.

Figure 10:
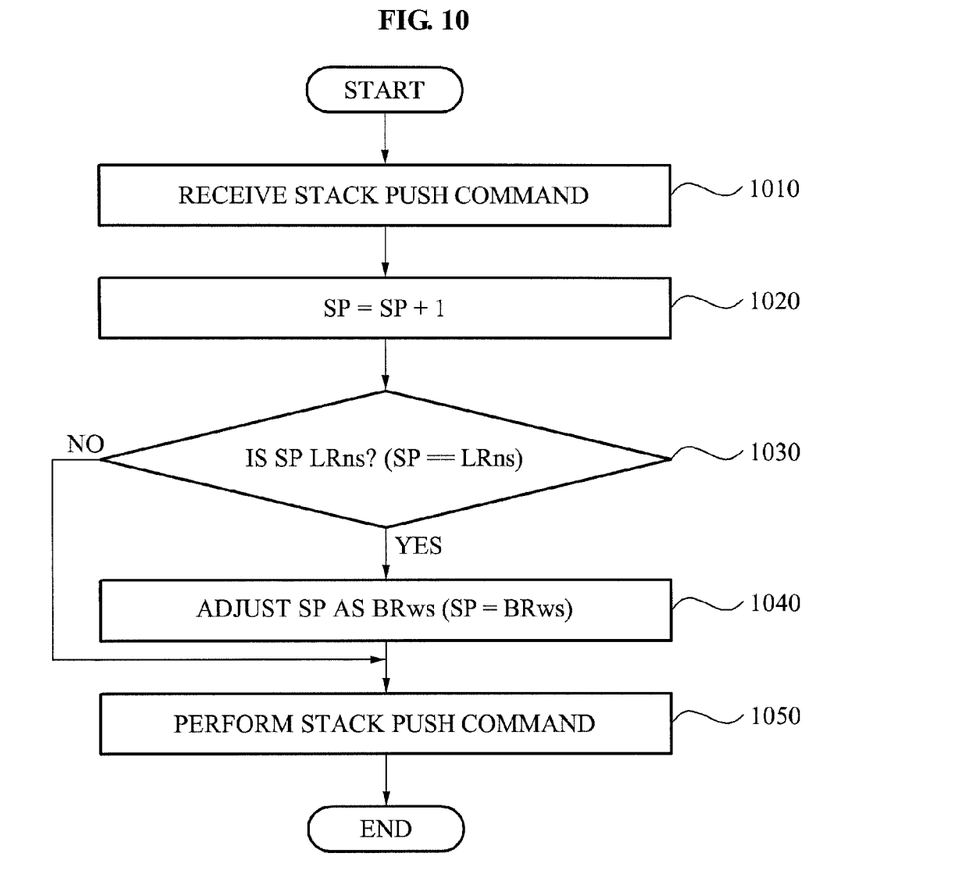
FIG. 10 is a flowchart illustrating a process of performing a stack PUSH command according to a memory management method according to example embodiments.

FIG. 10 illustrates a process of performing a stack PUSH command according to a memory management method according to example embodiments.

When a stack PUSH command is received in operation 1010, a SP is incremented by "1" in operation 1020.

In operation 1030, it may be determined whether a SP is the same as the LRns of FIG. 5.

When the SP is the same as the LRns, the SP may be adjusted to be the same as the BRws of FIG. 5 in operation 1040.

In operation 1050, the stack PUSH command is performed.

The above-described example embodiments may also be implemented through computer readable code/instructions in/on a non-transitory medium, e.g., a non-transitory computer readable medium, to control at least one processing element to implement any above example embodiments. The non-transitory medium can correspond to medium/media permitting the storing or transmission of the computer readable code.

The computer readable code can be recorded or transferred on a non-transitory medium in a variety of ways, with examples of the medium including recording media, such as hardware devices that are specially configured to store and perform program instructions, such as read-only memory (ROM), random access memory (RAM), flash memory, and the like, magnetic storage media (e.g., ROM, floppy disks, hard disks, etc.) and optical recording media (e.g., CD-ROMs, or DVDs), and transmission media. The non-transitory media may also be a distributed network, so that the computer readable code is stored or transferred and executed in a distributed fashion. Still further, as only an example, the processing element could include a processor or a computer processor, and processing elements may be distributed or included in a single device.

The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. Examples of program instructions include both machine code, such as produced by a compiler, and files containing higher level code that may be executed by the computer using an interpreter. In addition to the above described embodiments, example embodiments can also be implemented as hardware, e.g., at least one hardware based processing unit including at least one processor capable of implementing any above described example embodiments.

Although a few embodiments have been shown and described, it should be appreciated by those skilled in the art that changes may be made in these embodiments without departing from the principles and spirit of the disclosure, the scope of which is defined by the claims and their equivalents.

What is claimed is:

1. A computing system, comprising:
a first memory configured to allocate an area storing a first data structure corresponding to a plurality of tasks processed in a processor, wherein the first memory is an internal memory of the processor and the processor is internal to the computing system;
a second memory configured to allocate an area storing a second data structure corresponding to the plurality of tasks, wherein data corresponding to the each task is stored in the second data structure instead of the first data structure in response to filling of the first data structure in excess of an average size thereof, and wherein the second memory is an external memory of the processor; and
a memory controller configured to analyze an amount of a memory consumed and a temporal distribution of the amount of the memory consumed while processing the plurality of tasks in the processor and to determine, based on the analyzed amount of the memory consumption, a size of the area storing the first data structure and a size of the area storing the second data structure,
wherein the memory controller is configured to:
determine, as a size of the first data structure, a first threshold value that is equal to or greater than an amount of the memory consumption that is greater than or equal to an average memory consumption amount, and
determine, as a size of the second data structure, a difference between a maximum value in the analyzed temporal distribution of the amount of the memory consumption and the first threshold value.

2. The computing system of claim 1, wherein the first memory is a scratch pad memory.

3. The computing system of claim 1, wherein the first data structure and the second data structure are stacks.

4. The computing system of claim 3, wherein, when a compiler of the computing system compiles a function, the computing system generates:
machine code to, in response to the filling of the first data structure in excess of an average size thereof, adjust a stack pointer as a first address of the second data structure when the stack pointer is beyond an address of the first data structure while performing a stack PUSH command; and
machine code to adjust the stack pointer as a last address of the first data structure when the stack pointer is beyond an address of the second data structure while performing a stack POP command.

5. The computing system of claim 3, further comprising:
a first register configured to store a last address of the first data structure; and
a second register configured to store a first address of the second data structure.

6. The computing system of claim 5, wherein a code line is added to macro code of a stack POP command when the stack pointer is the first address of the second data structure, and the code line adjusts the stack pointer as the last address of the first data structure.

7. The computing system of claim 5, wherein a code line is added to a macro code of a stack PUSH command when the stack pointer is the last address of the first data structure, and the code line, in response to the filling of the first data structure in excess of an average size thereof, adjusts the stack pointer as the first address of the second data structure.

8. The computing system of claim 1, wherein the first memory is further configured to allocate a shared data structure area with respect to the plurality of tasks.

9. A method of managing a memory in a computing system, the method comprising:
analyzing an amount of a memory consumed and a temporal distribution of the amount of a memory consumed while processing a plurality of tasks in a processor;
allocating, to a first memory, a first data structure corresponding to the plurality of tasks, the first data structure determined based on the analyzed amount of the memory consumption, and a size of the first data structure being a first threshold value; and
allocating, to a second memory, a second data structure corresponding to the plurality of tasks, a size of the second data structure being a difference between a maximum value in the analyzed amount of the memory consumption and the first threshold value,
wherein the first memory is an internal memory of the processor and the second memory is an external memory of the processor,
wherein data corresponding to the plurality of tasks is stored in the second data structure instead of the first data structure in response to filling of the first data structure in excess of an average size thereof,
wherein the first threshold value is equal to or greater than an amount of the memory consumption that is greater than or equal to an average memory consumption amount, and
wherein the size of the second data structure is determined as a difference between a maximum value in the analyzed temporal distribution of the amount of the memory consumption and the first threshold value.

10. The method of claim 9, wherein the first data structure and the second data structure are stacks.

11. The method of claim 10, wherein, when a stack POP command is received, the method further comprises:
determining whether a stack pointer is a first address of the second data structure; and
adjusting the stack pointer as a last address of the first data structure when the stack pointer is the first address of the second data structure.

12. The method of claim 10, wherein, when a stack PUSH command is received, the method further comprises:
determining whether a stack pointer is a last address of the first data structure; and
adjusting, in response to the filling of the first data structure in excess of an average size thereof, the stack pointer as the first address of the second data structure when the stack pointer is the last address of the first data structure.

13. At least one non-transitory computer readable recording medium comprising computer readable instructions that control at least one processor to implement the method of claim 9.

14. The computing system of claim 3, wherein the first threshold value is lower than the maximum value.

15. The computer system of claim 1, wherein the data corresponding to the plurality of tasks is pushed onto the second data structure when a push command is no longer performed on the first data structure.

16. The computer system of claim 1, wherein a data structure is allocated to the plurality of tasks, such that the data structure is divided and a portion of the data structure is allocated to a high speed memory of a hierarchical memory structure and a remaining structure is allocated to a low speed memory of the hierarchical memory.

* * * * *